United States Patent [19]

Anderson et al.

[11] Patent Number: 4,475,332
[45] Date of Patent: Oct. 9, 1984

[54] MANUALLY OPERABLE VARIABLE BLEED FOR HYDROSTATIC TRANSMISSION

[75] Inventors: Ronald L. Anderson; John R. Harms, both of Burlington, Iowa

[73] Assignee: J. I. Case Company, Racine, Wis.

[21] Appl. No.: 350,989

[22] Filed: Feb. 22, 1982

[51] Int. Cl.³ ............................................. F16D 31/02
[52] U.S. Cl. ........................................ 60/329; 60/456; 60/489
[58] Field of Search ................ 60/329, 487, 455, 456, 60/484, 488, 489

[56] References Cited

U.S. PATENT DOCUMENTS 3,451,218  9/1967  Grant ................................... 60/489
4,332,134  6/1982  Cochran et al. ....................... 60/488

Primary Examiner—Robert E. Garrett
Assistant Examiner—John M. Husar
Attorney, Agent, or Firm—Dressler, Goldsmith, Shore, Sutker & Milnamow Ltd.

[57] ABSTRACT

A closed loop hydrostatic transmission is disclosed which includes an improved hydraulic fluid bleed arrangement. The fluid bleed arrangement includes a variable flow bleed valve hydraulically joined with each of the closed loops of the hydrostatic transmission. Each variable bleed valve is operatively associated with the control mechanism which selectively controls the reversible flow fluid pump of the closed loop for direction of fluid under pressure in forward and reverse directions in the loop. The variable action of each bleed valve permits a relatively greater amount of hydraulic fluid to be bled from the closed loop during periods of operation when the flow of hydraulic fluid otherwise lost from the closed loops is insufficient to permit adequate replenishment of fluid in the loops with cooler charging fluid. Additionally, the variable bleed valves of the system reduce the amount of fluid bled from the loops during periods of operation when a relatively high rate of hydraulic fluid bleed is not desired, thus permitting the charging system of the hydrostatic transmission to include a charging pump of relatively smaller displacement.

3 Claims, 2 Drawing Figures

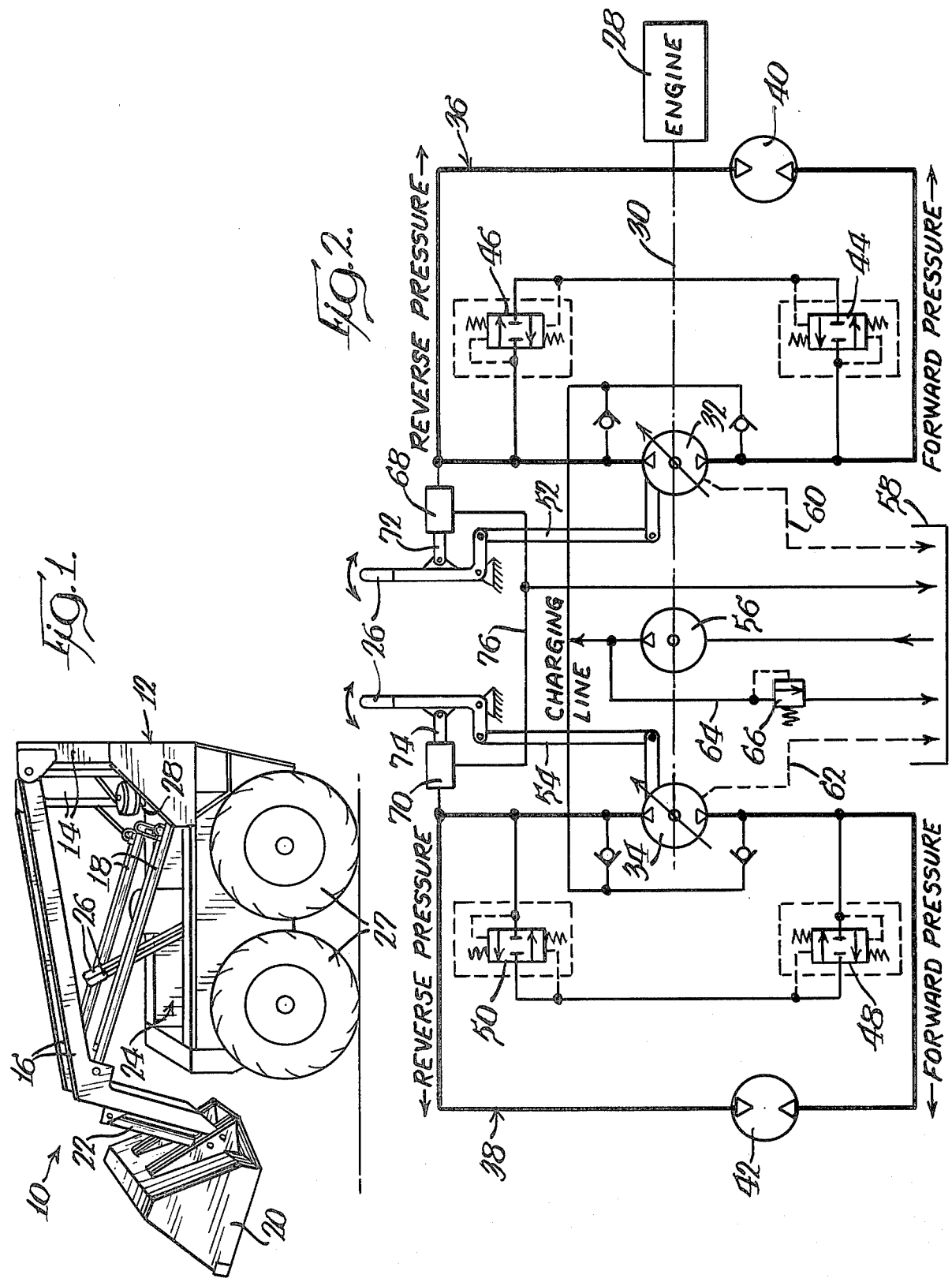

MANUALLY OPERABLE VARIABLE BLEED FOR HYDROSTATIC TRANSMISSION

TECHNICAL FIELD

The present invention relates generally to material handling implements and the like having hydraulic drive systems, and more particularly to an improved hydraulic fluid bleed arrangement for an implement having a closed loop, hydrostatic transmission.

BACKGROUND OF THE INVENTION

Various types of hydraulic drive systems are known for material handling implements such as tractors, loaders, and like equipment. One type of hydraulic drive system frequently used is referred to as a closed loop hydrostatic transmission. This type of system includes a reversible flow, variable displacement hydraulic fluid pump hydraulically joined in a closed loop with either a fixed or variable displacement hydraulic motor. An internal combustion engine is typically provided for driving the variable displacement pump. Control of pressurized hydraulic fluid within the closed loop is provided by a manually operated linkage which operates the variable displacement pump to control the direction and rate of hydraulic fluid flow within the closed loop. In this way, the hydraulic motor of the hydrostatic transmission may be selectively operated in forward and reverse directions at varying speeds.

The hydraulic motor of the closed transmission loop is connected through a suitable drive train with the drive means of the implement, such as wheels or a crawler track. Typically, the implement transmission includes a pair of closed hydrostatic transmission loops, each having a variable displacement pump hydraulically joined with a hydraulic motor. The motor of each loop is connected with wheels or a crawler track on one side of the implement or the other. Because the closed loops may be independently operated, this type of arrangement permits the operator of the implement to not only drive the implement in forward and reverse directions, but permits the implement to be maneuvered by selective independent control of each of the closed transmission loops. Drive systems of this description are typically employed in so-called skid-steer loaders, crawler tractors, and other similar implements where independent control of drive means on opposite sides of the implement permit the implement to be maneuvered as desired.

As with most hydraulic systems, optimum performance of closed loop hydrostatic transmissions relies, in part, upon maintaining the hydraulic fluid within the system within a certain specified temperature range. If the temperature of the hydraulic fluid within the system is higher than the desired level, the lubricating characteristics of the fluid may be impaired, and breakdown of the fluid into sludge and other contaminants may result. Additionally, excessive heating of the hydraulic fluid within the transmission system may result in premature failure of seals and other components within the system, while resultant loss of viscosity of the fluid at higher temperatues reduces the efficiency of the hydraulic fluid pumps in the system.

Since fluid friction resulting from flow of hydraulic fluid within the closed loops of the hydrostatic drive system creates heat which increases the temperature of the fluid within the system, it is necessary that some arrangement be provided so that the temperature of the fluid within the loops is maintained within the desired specified range. While some of the heat may be naturally dissipated from the system, most hydrostatic transmission systems include an arrangement for replenishing the hydraulic fluid in the closed loops with relatively cooler make-up or charging fluid.

A typical closed loop hydrostatic transmission system includes a hydraulic fluid charging pump which is provided to introduce hydraulic fluid to the closed loops of the transmission from a hydraulic fluid reservoir. The primary purpose of the charging pump is to maintain positive pressure or head on the inlet or low pressure (suction) side of the variable displacement pumps of the closed transmission loops. This pressure is necessary to ensure that the piston shoes of the typical variable displacement pump are maintained tightly against the tiltable swash plate of this type of pump; damage to the piston shoes would otherwise occur. A further function performed by the charging pump of the transmission system is to replenish hydraulic fluid in the closed loop with the relatively cool hydraulic fluid drawn from the fluid reservoir of the system.

The introduction of cooler charging fluid to the closed loops of the hydrostatic transmission is in part accommodated by the provision of case drains in each of the variable displacement pumps of the transmission loops. The pump case drains, which permit proper operation of the reversible variable displacement pumps, provide "leakage" of hydraulic fluid from the closed loops of the transmission. The charging system replenishes the fluid in the closed loops which is lost in this manner, directing relatively cooler hydraulic fluid to the low pressure sides of the transmission loops through check valves. Fluid from the case drains of the hydraulic pumps is returned to the fluid reservoir of the system so that the excess heat in the fluid may be dissipated.

Because fluid lost from the closed loops of the transmission through the pump case drains may be insufficient to permit proper replenishment of the fluid in the loops with cooler charging fluid, various arrangements are known for providing a controlled bleed of hydraulic fluid from the closed loop lines of the transmission. Typically, a hydraulic fluid bleed valve is teed into each of the closed loops of the transmission, generally bleeding a more or less constant amount of hydraulic fluid from each of the loops. The fluid bled from the loops in this manner is replenished with cooler charging fluid from the charging system so that the temperature of the fluid within the loops is maintained within the specified range.

For the most part, this type of closed loop hydrostatic transmission, including pump case drains and loop fluid bleeds, is effective in maintaining the temperature of the fluid as desired. For instance, when the closed loops are operated at relatively high pressures, such as during work operations, a relatively greater amount of hot fluid is forced out of the case drains of the hydraulic pumps of the loops, and is replaced with cooler charging fluid by the charge system. While fluid overheating is usually not a problem under these operating conditions, the hydraulic pump of the transmission charging system must be of sufficient displacement to replenish the fluid lost from the loops through the pump case drains and fluid bleeds, even though the amount of fluid lost from the loops may be in excess of that needed for proper fluid temperature control.

In contrast, overheating of hydraulic fluid in the closed loops is a common problem in those situations where there is relatively high fluid flow or displacement at relatively lower pressure. This will typically be the situation during "roading" of the implement, i.e., when the implement is operated at relatively higher speeds with little or no load (such as driving between job sites, etc.). It will be appreciated that in these situations, because the system is operating at a relatively lower pressure, a relatively lesser amount of hot fluid from the loops is forced out of the pump case drains. Because typical bleed systems for bleeding fluid from the closed loops do not differentiate between conditions of relatively high and low fluid pressure within the loops, bleeding off a more or less constant amount of fluid, roading of the implement as described can result in excessive elevation of fluid temperature within the loops. This is because the relatively lesser amount of hot fluid flow from the loops through the pump case drains, together with the generally constant flow through the bleed valves, does not permit sufficient cooler charging fluid to be introduced into the loops to maintain the fluid temperature in the loops within the desired range. As described, operation of the hydrostatic transmission with the hydraulic fluid at temperatures beyond the specified range is detrimental to the components of the system.

Thus, a hydraulic fluid bleed arrangement for a closed loop hydrostatic transmission which responsively varies the amount of fluid bled from the loops acts to overcome the problems of fluid overheating which may be encountered with typical fluid bleed arrangements and improves the reliability and performance of these type of drive systems.

SUMMARY OF THE INVENTION

In accordance with the present invention, a closed loop hydrostatic transmission for material handling implement or like piece of equipment is disclosed which provides improved control of the temperature of hydraulic fluid within the closed loops of the system. An improved bleed valve arrangement is provided for bleeding hydraulic fluid from each of the closed loops of the transmission, with a bleed valve for each loop being operatively associated with the control mechanism for the reversible flow pump of that closed loop. In this way, variable hydraulic fluid bleed is provided for the closed loops so that temperature of the hydraulic fluid in the loops may be better controlled.

The closed loop hydrostatic transmission embodying the present invention comprises a pair of closed transmission loops. Each loop includes a reversible flow, variable displacement hydraulic fluid pump, and a reversible hydraulic motor hydraulically joined in the closed loop. A control mechanism is provided for controlling the pump in each loop for selective direction of hydraulic fluid under pressure within the loop for driving the motor of the loop in forward and reverse directions. Depending upon direction of flow of fluid within each loop, one side of each loop is referred to as the "high pressure side," and the other side is referred to as the "low pressure side" of the loop.

The closed loop transmission embodying the present invention includes a charging system which functions to maintain positive pressure on the suction or inlet side of the variable displacement pumps of the transmission loops. Damage to the pumps would otherwise occur. The charging system includes a fluid pump which directs fluid from a fluid reservoir through check valves to whichever side of each closed loop is the low pressure side (i.e., the suction side of the reversible flow pump). Typically, the charging pump may be driven by the same drive mechanism which powers the variable displacement pump of each closed loop, such as an internal combustion engine driving both the variable displacement pumps and the charging pump by a common drive shaft.

The charging system further functions to maintain the temperature of the fluid within each closed loop within the desired range by supplying relatively cooler hydraulic fluid from the fluid reservoir to the closed loops. The charging system replenishes fluid lost from the closed loops through the case drains of the variable displacement pumps or by other means.

While replenishment by the charging system of hydraulic fluid lost from the closed loops through the case drains of the variable displacement pumps is sufficient to maintain the temperature of the fluid in the loops within the specified range under some operating conditions, the present invention includes an improved bleed valve arrangement for bleeding hot hydraulic fluid from each loop so that an adequate supply of cooler charging fluid may be introduced to the loops under various operating conditions. Significantly, a variable flow bleed valve is provided which responsively varies or meters the amount of hydraulic fluid bled from each loop during operation of the transmission. Each variable bleed valve preferably comprises a metering spool valve, although it will be appreciated that other types of hydraulic valves may be used.

In order to provide desired variation in the amount of fluid bled from each loop, each variable bleed valve is operatively associated with the control mechanism for the variable displacement pump of that loop. A valve control linkage operatively connects each bleed valve with the control linkage of the pump of that loop so that actuation of the pump control linkage for increasing and decreasing fluid flow from the pump operates the bleed valve to respectively increase and decrease the fluid bled from the closed loop. This permits better cooling of the system since a relatively greater amount of fluid is bled from each loop through the bleed valve during periods of operation of the transmission at relatively high flow rates, even at relatively low fluid pressure. Ordinarily, this type of high flow/low pressure operating condition does not result in sufficient fluid being forced through the case drain of the variable displacement pump in each loop to permit adequate replenishment with cooler charging fluid to maintain the temperature of the fluid in the loops as desired. Further benefit is provided since the variable nature of each bleed valve reduces the amount of fluid bled from that closed loop when the pump control linkage is operated to decrease the displacement or flow rate of the pump of that loop. Since low displacement operation is usually coincident with high pressure flow, the amount of fluid bled from each loop by each variable bleed valve is desirably relatively low, since an adequate amount of hot fluid is forced from the case drain of the variable displacement pump of each loop to permit proper replenishment with charging fluid. This feature of the present invention permits use of a relatively smaller displacement charging pump in the system.

While a variable bleed arrangement in accordance with the present invention may be provided in various ways, it is preferred that the variable bleed valves be hydraulically joined or teed to the closed loops on the reverse pressure sides of the loops. This side of each closed loop is the low pressure side when the reversible variable displacement pump operates the motor in that loop in a forward direction. This arrangement is preferred since these types of transmissions are typically operated in a forward direction more than a reverse direction during normal operations, and thus it is most economical to provide a single variable bleed for each loop to bleed fluid from the low pressure side of the loop when it is operated in a forward direction. Additionally, these transmissions are usually operated in a forward direction during roading of the implement which typifies high flow/low pressure operation, the problems of which the present invention overcomes.

Numerous other advantages and features of the present invention will become readily apparent from the following detailed description of the invention and embodiment thereof, from the claims and from the accompanying drawings in which like numerals are employed to designate like parts throughout the same.

BRIEF DESCRIPTION OF THE DRAWINGS

FIG. 1 is a perspective view of the typical material handling implement having a closed loop hydrostatic transmission; and FIG. 2 is a schematic diagram of a closed loop hydrostatic transmission embodying the present invention.

DETAILED DESCRIPTION

While the present invention is susceptible to embodiment in different forms, there is shown in the drawings and will hereinafter be described a presently preferred embodiment with the understanding that the present disclosure is to be considered as an exemplification of the invention and is not intended to limit the invention to the specific embodiment illustrated.

With reference to FIG. 1, a material handling implement 10 is illustrated. This type of implement is frequently referred to as a skid-steer loader. Loader 10 includes a body 12 having a pair of upwardly extending stanchions 14 on opposite sides thereof. Each stanchion 14 pivotally supports a lift arm 16 which extends forwardly of the loader, with a pair of hydraulic fluid rams 18 respectively operatively connected between body 12 and lift arms 16. Lift arms 16 support a bucket 20 or other similar implement, which is pivotal with respect to lift arms 16 by hydraulic fluid rams 22 (one being shown). Operations of fluid rams 18 and 22 permits articulation of lift arms 16 and bucket 20 for work operations.

Loader 10 is controlled by an operator who sits in operator compartment 24 and manipulates a pair of control levers 26. Typically, control levers 26 independently operate a drive train provided for each of the pairs of wheels 27 (one pair being shown) on opposite sides of the loader. This operation is provided by control of a hydraulic transmission having a pair of closed transmission loops, each driving one of the pairs of wheels on one side or the other of loader 10 in forward and reverse directions. Levers 26 control both the direction and speed of rotation of the drive wheels, in this way permitting maneuvering of the loader by "skid steering." While the present invention is discussed in association with loader 10, it will be appreciated that a closed loop hydrostatic transmission embodying the present variable bleed valve arrangement may be used in a wide variety of implements and pieces of equipment, such as crawler-type tractors and the like.

FIG. 2 illustrates schematically the hydrostatic transmission system of loader 10 which includes a pair of closed transmission loops for respectively operating the pairs of wheels on opposite sides of the loader. An internal combustion engine 28 (usually rearwardly mounted in loader 10, as illustrated in FIG. 1) powers a common drive shaft 30 which drives a pair of reversible fluid flow, variable displacement pumps 32 and 34 respectively provided in closed hydrostatic transmission loops 36 and 38. Pumps 32 and 34 typically comprise variable positive displacement pumps each having a tilting or swash plate which may be selectively positioned to permit variable direction of fluid under pressure in forward and reverse directions within closed loops 36 and 38.

Each of closed loops 36 and 38 are provided with a reversible hydraulic motor 40 and 42. This type of hydraulic motor may be of either the variable or fixed displacement type. A so-called gerator motor is one type of fixed displacement hydraulic motor frequently used in closed loop transmissions. Motors 40 and 42 are respectively hydraulically joined in closed loops 36 and 38 with variable displacement pumps 32 and 34. As indicated, one side of each of the closed loops is the high pressure side of that loop when it is operated to drive the motor of the loop in a forward direction, and the other side of each loop is the high pressure side when operated in a reverse direction. Relief valves 44 and 46 are provided between the forward and reverse pressure sides of closed loop 36, and relief valves 48 and 50 are similarly provided for closed loop 38.

As discussed, selective control of the fluid flow in each of closed loops 36 and 38 is provided by manipulation of control levers 26 of the loader 10. Control linkages 52 and 54 (illustrated schematically) respectively connect the control levers 26 with variable displacement pumps 32 and 34 to control the direction of fluid under pressure within the closed loops. Linkages 52 and 54 act to position the swash plates of pumps 32 and 34 to control their direction and rate of fluid displacement.

As discussed, a closed loop hydrostatic transmission system as disclosed typically includes a charging system for maintaining positive pressure or head on the inlet side of pumps 32 and 34, and for replenishing fluid bled or otherwise lost from the closed loops with cooler charging fluid from a fluid reservoir. In this way, the temperature of fluid within the closed loops is maintained within the desired operating range. The charging system includes a hydraulic fluid charging pump 56, typically joined to common engine shaft 30 which drives pumps 32 and 34. Charging pump 56 is preferably of the fixed displacement type, and supplies fluid under pressure through the charging line indicated to whichever of the sides of each closed loop 36 and 38 is the low pressure side (which of course changes as each loop is operated between forward and reverse directions). Check valves are provided to prevent flow from the closed loops into the charging line.

Charging pump 56 supplies relatively cooler hydraulic fluid from reservoir or sump 58 to replenish fluid in the closed loops which is "lost" from the loops through case drains 60 and 62 from variable displacement pumps 32 and 34. Pumps 32 and 34 are necessarily provided with case drains 60 and 62 to relieve fluid pressure from the low pressure side of their reversible pistons which would otherwise build up within the pumps as a result of their reversible action. Case drains 60 and 62 are pressure responsive in the sense that a relatively greater amount of hydraulic fluid flows through the case drains to the sump 58 during high pressure operation of pumps 32 and 34, with a lesser amount flowing during low pressure operation. The charging system includes a bypass 64 with a relief valve 66 which returns fluid to sump 58 from charging pump 56 when the charging pump supplies a greater amount of fluid than is needed to replenish fluid lost from loops 36 and 38.

Because case drains 60 and 62 may not provide sufficient flow of fluid from closed loops 36 and 38 under all operating conditions to accommodate sufficient replenishment of fluid in the loops with cooler fluid from the charging system for proper temperature control, each of the closed loops is provided with a novel bleed valve arrangement in accordance with the present invention. Specifically, variable bleed valves 68 and 70 are respectively hydraulically joined with closed loops 36 and 38, and are preferably teed to the reverse pressure side of each of the loops. While various types of valve arrangements may be employed, bleed valves 68 and 70 preferably comprise metering spool valves which may be operated to selectively vary or meter the amount of flow therethrough. Other types of valves which permit this selective metering operation may be used. The inclusion of variable bleed valves 68 and 70 with the present closed loop hydrostatic transmission system permits control of the amount of fluid bled from each of the loops unlike bleed valves heretofore typically used which generally bleed off a more or less constant amount of fluid.

In order to provide selective operation of variable bleed valves 68 and 70, each bleed valve is respectively operatively connected with one of control levers 26 by a valve control linkage 72 and 74 (illustrated schematically). It will be appreciated that the configuration of valve control linkages 72 and 74 is a matter of design choice, with the linkages suitably operatively connecting the valve spools of bleed valves 68 and 70 with control levers 26.

The valve control linkages control bleed valves 68 and 70 responsively to the position of the control levers 26. In this way, the amount of fluid bled through the bleed valves is selectively varied as the control levers are manipulated to operate reversible flow pumps 32 and 34. This novel arrangement permits improved operation of the system by ensuring that there is adequate "loss" and replenishment of fluid in the closed loops to maintain the temperature of the fluid in the loops within the desired range. Flow from bleed valves 68 and 70 is directed to sump 58 of the system through bleed drain line 76.

As discussed, the problem of fluid overheating in the closed loops of the hydrostatic transmission is sometimes encountered during conditions of high flow rate and low flow pressure within the loops, as may typically occur during roading of the loader 10 or other low-load operations. Under these conditions, fluid flow through case drains 60 and 62 from variable displacement pumps 32 and 34 may be insufficient to permit an adequate supply of cooler charging fluid to be introduced to the loops. Thus, bleed valves 68 and 70 are operatively connected through linkages 72 and 74 with the control levers 26 so that the amount of fluid bled from the loops through the bleed valves is a function of the position of the control levers.

Preferably, the bleed valves and their control linkages are arranged to increase and decrease the amount of hydraulic fluid bled from the loops as the control levers are manipulated to respectively increase and decrease the flow of fluid in the closed loops in a forward direction. In this manner, the amount of fluid bled from the closed loops through the bleed valves 68 and 70 is responsively varied as control levers 26 are manipulated. The further control levers 26 are moved to increase the rate of flow of reversible, variable displacement pumps 32 and 34, the greater the amount of hydraulic fluid bled from the loops by the variable bleed valves 68 and 70, and vice versa. In essence, linkages 72 and 74 operate valves 68 and 70 so that the amount of fluid bled from the loops relatively increases when pumps 32 and 34 are swashed to increase flow and the fluid pressure in the high pressure side of the loops is relatively low. It will be appreciated that the rate of fluid bleeding by bleed valves 68 and 70 may increase proportionately with the movement of the control levers 26, or may otherwise responsively vary, depending upon the nature of the variable bleed valves and their control linkages, and the desired operational characteristics of the system.

While variable bleed valves 68 and 70 are illustrated as teed to the reverse pressure side of closed loops 36 and 38, it will be appreciated that a further variable bleed valve could be provided on the forward pressure side of each of the loops to responsively vary the amount of fluid bled from the system when their loops are operated in a reverse direction. The arrangement illustrated is preferred, however, since equipment employing this type of hydrostatic transmission is usually operated in a forward direction more than in a reverse direction. Thus, by providing only one variable bleed valve joined to the reverse pressure side of each of closed loops 36, a relatively economical hydraulic bleed arrangement is provided which provides the desired variation in the bleed flow rate during most operating conditions of the transmission.

Significantly, not only does the present arrangement permit for greater replenishment of fluid in the closed loops of the transmission during periods of high flow/low pressure operation as described, but further provides minimization of the amount of fluid bled from the loops during low flow situations, which are usually coincidental with high pressure in the loops. Since a greater amount of hot hydraulic fluid is forced out of the case drains 60 and 62 of pumps 32 and 34 during high pressure operation, it is permissible that a lesser amount of oil be bled through the bleed valves from the closed loops. Because bleed arrangements previously known usually bleed a generally constant amount of fluid from the loops, there are some operating conditions during which the combined fluid losses from the pump case drains and bleed valves of the transmission loops are more than needed to permit adequate replenishment with cooler charging fluid. Naturally, a charging system pump must be provided for such systems which has sufficient displacement to replace the fluid lost, even if the amount lost is excessive. Since the hydraulic bleed arrangement of the present invention provides variation in the amount of hydraulic fluid bled from the loops, responsively to the position of the reversible, variable displacement pump control mechanisms, the amount of fluid bled from the loops during low displacement operation of pumps is relatively decreased. Since there is not excessive loss of fluid from the system under these conditions in the manner of previous arrangements, the present system has the added benefit of permitting utilization of a smaller displacement charging pump 56 than in systems heretofore known.

Thus, an improved hydraulic fluid bleed arrangement for a closed loop hydrostatic transmission is disclosed which provides selective variation in the amount of hydraulic fluid bled from the loops responsively to the position of the control mechanisms which operate the reversible flow hydraulic pumps of the transmission. In this way, improved temperature control of the fluid within the loops is achieved, with the added benefit of allowing a relatively smaller displacement charging pump to be provided in the charging system of the hydrostatic transmission.

The foregoing is intended as illustrative but not limiting. Variations and modifications may be effected without departing from the true spirit and scope of the novel concept of the present invention. No limitation with respect to the specific apparatus illustrated herein is intended or should be inferred. It is, of course, intended to cover by appended claims all such modifications as fall within the scope of the claims.

What is claimed is:

1. A closed loop hydrostatic transmission, comprising:
   reversible pump means and reversible motor means hydraulically joined in a closed loop,
   pump control means for selectively controlling said pump means to direct fluid under pressure to said motor means for operation of said motor means in forward and reverse directions,
   charge means for replenishing fluid in said closed loop from a fluid reservoir, and
   variable flow bleed valve means hydraulically joined to said closed loop for bleeding hydraulic fluid therefrom to permit replenishment with fluid from said charge means, said valve means being operatively connected with said pump control means by valve control means whereby fluid flow through said valve means proportionately increases and decreases, respectively, in response to the operation of said pump control means to increase and decrease fluid flow from said pump means to operate said motor means in at least one of said forward and reverse directions.

2. The closed loop hydrostatic transmission of claim 1, wherein
   said bleed valve means comprises a hydraulic metering spool valve.

3. The closed loop hydrostatic transmission of claim 1, wherein
   said valve means operates to increase fluid flow during operation of said motor means in the forward direction.

* * * * *